(No Model.)

G. J. B. RODWELL.
MACHINE FOR PREPARING THE SURFACE OF STEEL FOR ETCHING.

No. 429,644. Patented June 10, 1890.

Witnesses.
F. B. Featherstonhaugh.
W. G. McMillan

Inventor:
G. J. B. Rodwell
by
Donald C. Ridout & Co.
Atty.

UNITED STATES PATENT OFFICE.

GEORGE J. B. RODWELL, OF TORONTO, ONTARIO, CANADA, ASSIGNOR OF ONE-HALF TO BERTRAM & CO., OF SAME PLACE.

MACHINE FOR PREPARING THE SURFACE OF STEEL FOR ETCHING.

SPECIFICATION forming part of Letters Patent No. 429,644, dated June 10, 1890.

Application filed August 8, 1889. Serial No. 320,192. (No model.)

*To all whom it may concern:*

Be it known that I, GEORGE JAMES BELLAMY RODWELL, manufacturer, of the city of Toronto, in the county of York, in the Province of Ontario, Canada, have invented a certain new and Improved Machine for Preparing the Surface of Steel or other Metal for the Purpose of Etching by Acid on the said Surface, of which the following is a specification.

The object of the invention is to devise a machine for preparing the surface of steel or other metal for the purpose of etching by acid on the said surface names, business devices, or other ornamentations; and it consists, essentially, of a sheet of vulcanized rubber or other like material having sunk in or raised on its surface the names, business devices, or other ornamentations it is desired to imprint on the steel or other metal surface, the said sheet of vulcanized rubber or like material being carried on a bar or frame in such a manner that it may be readily heated for the purpose of receiving the preparing-ink, and then be placed on the metal surface to be etched, the rubber sheet being so held that it may be placed and replaced upon the metal surface in exactly the same position, so that should it be found that on the first application sufficient ink has not been applied to the metal surface the rubber sheet may be reinked and replaced onto the metal surface as many times, and in exactly the same position each time, as may be necessary to accomplish the desired purpose.

Figure 1:
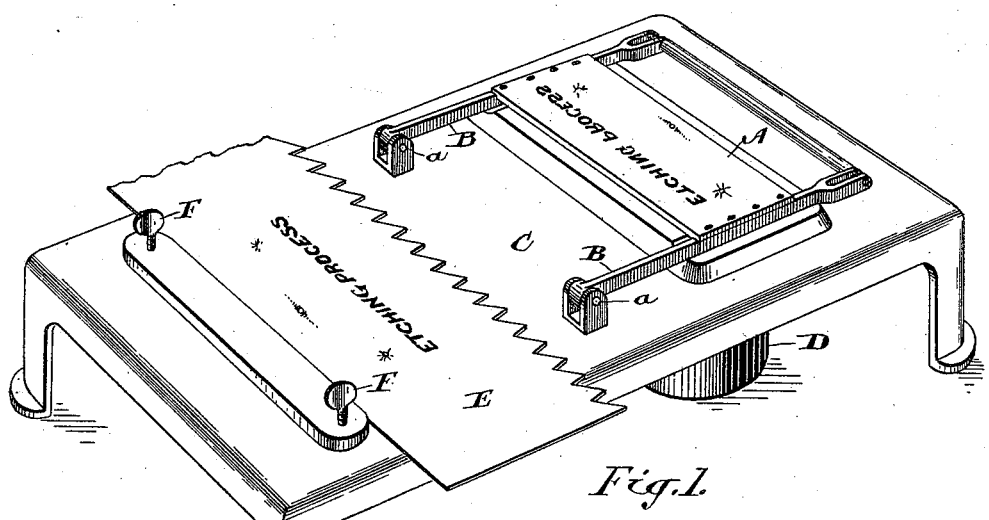
Figure 2:
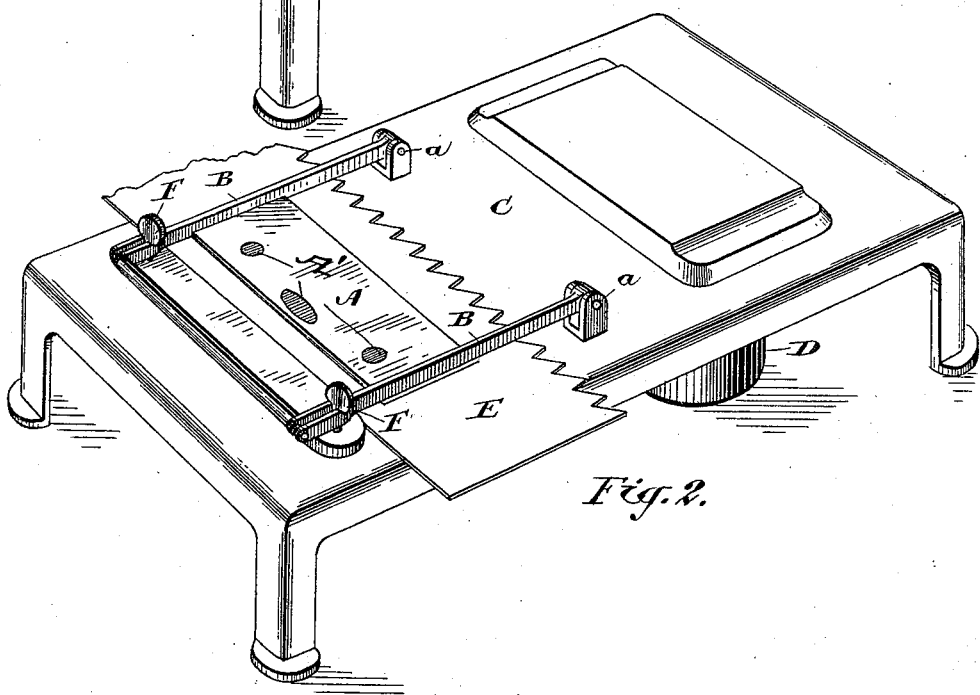

Figure 1 is a perspective view of my improved machine, showing the vulcanized-rubber sheet in position to receive the ink. Fig. 2 is a similar view of the machine, showing the vulcanized-rubber sheet applied to the surface of a saw on which the etching is to be effected.

On the 4th of November, 1885, I obtained Letters Patent of Great Britain, No. 13,351, for an improved process of imprinting on steel and other metal and apparatus therefor, in the specification of which I fully described the old process used previous to my then new invention. In my etching process which was covered by that patent I employed a sheet of vulcanized rubber, on the surface of which the device to be etched was engraved or otherwise embedded. The rubber sheet thus prepared was fixed to a roller, and after being properly inked the said roller was run over the surface to be etched, thereby applying the ink to the metal surface, and the design was ready for the acid.

In practice I have found that it was necessary, in order to completely cover the portion of the surface desired to be inked, that the roller be passed to and fro over the surface, and it was difficult, if not impossible, to move the roller over the said surface so accurately as to avoid interfering with the design.

In my present invention I dispense with the roller and so arrange the rubber sheet that it may be accurately placed and replaced upon the metal surface until the proper quantity of ink has been applied.

A represents the rubber sheet, on which the main business devices or other ornamentations are sunk in or raised on the surface, the sheet thus prepared being properly vulcanized and having a heavy canvas back fixed to it. Each end of the sheet A is fixed to a bar B, each bar being hinged at *a* to the bed-plate C. Below the bed-plate, at the point indicated, I place a lamp D, and on the opposite side of the bed-plate C, I provide a place to receive the saw E or other metal article which I may desire to mark or ornament.

The rubber sheet A is first laid on its back on the bed-plate C, in the position indicated in Fig. 1, where it is heated sufficiently by the lamp D to properly receive the requisite heat. The bars B are then turned over on their hinges *a*, so as to bring the inked surface of the sheet A on top of the saw E, and when in this position are locked by the thumb-screws F, or in any other suitable manner. Pressure is then applied to the top of the sheet A, so as to press the ink onto the saw E. In order to make lighter impressions where fine lines are used in the etching, I cut out portions of the canvas back of the sheet A, as at A′, immediately behind the design made in the rubber sheet, so that when the roller is applied to the back of the sheet A it will merely press the inked surface of the sheet A against the surface of the saw E, where the finer lines of the printing are to be made.

By loosening the thumb-screws F the bars

B may be swung back on their hinges until the rubber sheet A is once more brought back onto the bed-plate C immediately over the lamp D, where fresh ink may be applied, and afterward the sheet A once more brought back onto the surface of the saw, where it will return exactly to the position in which it originally rested.

From this description it will be seen that the surface of the saw may be accurately inked and reinked without any fear of smudging the pattern or design thus printed on its surface.

What I claim as my invention is—

The herein-described machine, consisting of the table, the arms hinged at their lower ends to the table and having their upper ends bifurcated, the sheet, as described, carried by said arms, and the screws adapted to enter the bifurcated ends of the arms and secure said arms, substantially as described.

Toronto, July 22, 1889.

GEORGE J. B. RODWELL.

In presence of—
CHARLES C. BALDWIN,
F. R. CAMERON.